(12) United States Patent
Zhang et al.

(10) Patent No.: US 11,584,079 B2
(45) Date of Patent: Feb. 21, 2023

(54) BUILD CHAMBER FOR USE IN POWDER BED-BASED LASER ADDITIVE MANUFACTURING PROCESSES

(71) Applicant: Robert Bosch GmbH, Stuttgart (DE)

(72) Inventors: Xiaobing Zhang, Highland Park, NJ (US); Bo Cheng, Malden, MA (US); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 16/592,250

(22) Filed: Oct. 3, 2019

(65) Prior Publication Data
US 2021/0101341 A1  Apr. 8, 2021

(51) Int. Cl.
| | |
|---|---|
| *B29C 64/35* | (2017.01) |
| *B29C 64/245* | (2017.01) |
| *B29C 64/268* | (2017.01) |
| *B33Y 30/00* | (2015.01) |
| *B29C 64/153* | (2017.01) |
| *B33Y 40/00* | (2020.01) |

(52) U.S. Cl.
CPC .......... *B29C 64/35* (2017.08); *B29C 64/245* (2017.08); *B29C 64/268* (2017.08); *B29C 64/153* (2017.08); *B33Y 30/00* (2014.12); *B33Y 40/00* (2014.12)

(58) Field of Classification Search
CPC ..... B29C 64/35; B29C 64/268; B29C 64/245; B29C 64/153; B33Y 30/00; B33Y 40/00
See application file for complete search history.

(56) References Cited

U.S. PATENT DOCUMENTS

| | | |
|---|---|---|
| 10,232,439 B2 | 3/2019 | Gold et al. |
| 2018/0111319 A1* | 4/2018 | Brezoczky ........... B23K 26/123 |
| 2018/0126650 A1* | 5/2018 | Murphree ................ B08B 5/04 |

(Continued)

FOREIGN PATENT DOCUMENTS

| | | | |
|---|---|---|---|
| CN | 102230943 B | 7/2012 | |
| DE | 102017222645 A1 * | 6/2019 | ............. B33Y 10/00 |

(Continued)

OTHER PUBLICATIONS

Ladewig et al. "Influence of the shielding gas flow on the removal of process by-products in the selective laser melting process", Additive Manufacturing, 10 (2016) p. 1-9. (Year: 2016).*

(Continued)

*Primary Examiner* — Joseph S Del Sole
*Assistant Examiner* — Ariella Machness
(74) *Attorney, Agent, or Firm* — Brooks Kushman P.C.

(57) ABSTRACT

Improved gas flow systems and methods for use with powder bed-based laser additive manufacturing chambers are described. The disclosed gas flow configurations and associated build chamber designs enhance the removability of laser melting emissions. In accordance with various configurations, the clear rate of generated-spatter contamination is improved by employing system designs in which the gas flow outlet is lowered toward the substrate, the gas flow inlet channel length is increased, uniform gas flow is enabled using multi-channeled pumps, and/or one or more supplementary gas inlet flows are introduced to the chamber design.

20 Claims, 17 Drawing Sheets

(56) References Cited

U.S. PATENT DOCUMENTS

| | | | |
|---|---|---|---|
| 2018/0178287 A1 | 6/2018 | Mamrak et al. | |
| 2019/0099943 A1* | 4/2019 | Connell | B22F 10/20 |
| 2019/0322050 A1 | 10/2019 | Connell | |
| 2019/0322051 A1 | 10/2019 | Wakelam et al. | |
| 2019/0366639 A1* | 12/2019 | Barocio | B33Y 70/00 |
| 2020/0039000 A1 | 2/2020 | Sweetland | |

FOREIGN PATENT DOCUMENTS

| | | | | |
|---|---|---|---|---|
| WO | WO-2018143953 A1 * | 8/2018 | | B41J 2/16552 |
| WO | WO-2020120912 A1 * | 6/2020 | | B22F 10/20 |

OTHER PUBLICATIONS

Chen et al. "Optimization of Inert Gas Flow Inside Laser Powder Bed Fusion Chamber with Computational Fluid Dynamics" Solid Freeform Fabrication 2018: Proceedings of the 29th Annual International Solid Freeform Fabrication Symposium—An Additive Manufacturing Conference, 2018, pp. 1931-1939 (Year: 2018).*

Chen et al., "Optimization of Inert Gas Flow inside Laser Powder-Bed Fusion Chamber with Computational Fluid Dynamics." Solid Freeform Fabrication 2018: Proceedings of the 29th Annual International Solid Freeform Fabrication Symposium—An Additive Manufacturing Conference, 2018, pp. 1931-1939.

Gunenthiram et al., "Experimental analysis of spatter generation and melt-pool behavior during the powder bed laser beam melting process," Journal of Materials Processing Technology, vol. 251, 2018, 12 pages.

Kruth et al., "Selective laser melting of iron-based powder," Journal of Materials Processing Technology, vol. 149, 2004, pp. 616-622, DOI: 10.1016/j.jmatprotec.2003 11.051.

Liu et al., "Investigation into spatter behavior during selective laser melting of AISI 316L stainless steel powder," Materials and Design, vol. 87, 2015, pp. 797-806, DOI: 10.1016/j.matdes.2015.08.086.

Ly et al., "Metal vapor micro-jet controls material redistribution in laser powder bed fusion additive manufacturing," Scientific Reports vol. 7, No. 4085, Jun. 22, 2017, 12 pages, DOI: 10.1038/s41598-017-04237-z.

Philo et al., "A Multiphase CFD Model for the Prediction of Particulate Accumulation in a Laser Powder Bed Fusion Process," TMS Annual Meeting & Exhibition, 2018, pp. 65-76, DOI: 10.1007/978-3-319-72059-3_7.

Philo et al., "A study into the effects of gas flow inlet design of the Renishaw AM250 laser powder bed fusion machine using computational modelling." Solid Freeform Fabrication 2017: Proceedings of the 28th Annual International Solid Freeform Fabrication Symposium—An Additive Manufacturing Conference Reviewed Paper, 2017, pp. 1203-1219.

Shao et al., "A simple expression for wind erosion threshold friction velocity," Journal of Geophysical Research, vol. 105, No. D17, Sep. 16, 2000, pp. 22437-22443.

Wang et al., "Flow analysis of the laminated manufacturing system with laser sintering of metal powder. Part I: flow uniformity inside the working chamber," The International Journal of Advanced Manufacturing Technology, vol. 92, Mar. 10, 2017, pp. 1299-1314, DOI: 10.1007/s00170-017-0213-5.

Zhao et al., "Real-time monitoring of laser powder bed fusion process using high-speed X-ray imaging and diffraction " Scientific Reports, vol. 7, No. 3602, Jun. 15, 2017, 11 pages, DOI: 10.1038/s41598-017-03761-2.

Cengel et al., "Fluid Mechanics: Fundamentals And Applications (Si Units)," Tata McGraw Hill Education Private Limited, 2010, Abridged Version, 2 pages.

* cited by examiner

Simulation: Center plane velocity

Simulation: Best plane velocity

Experiments: Center plane velocity

Experiments: Base plane velocity

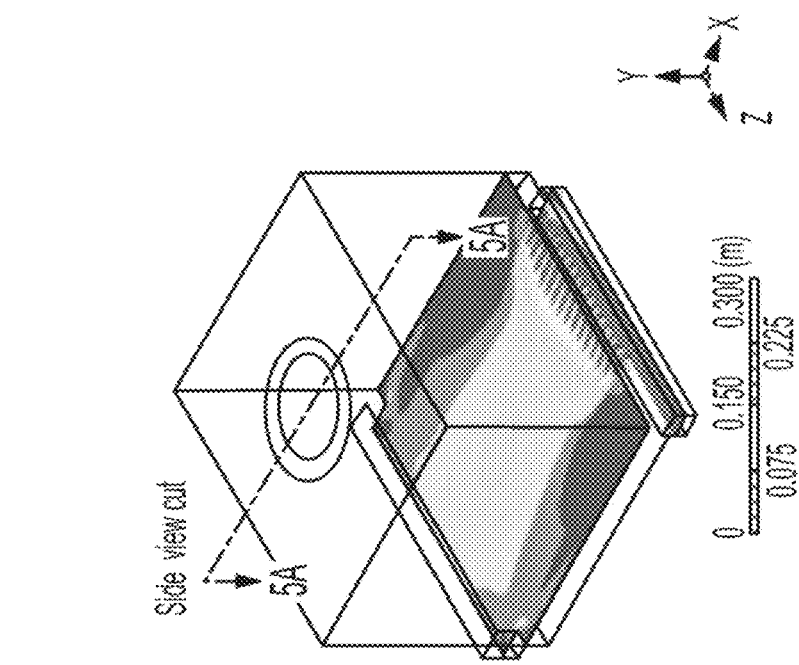
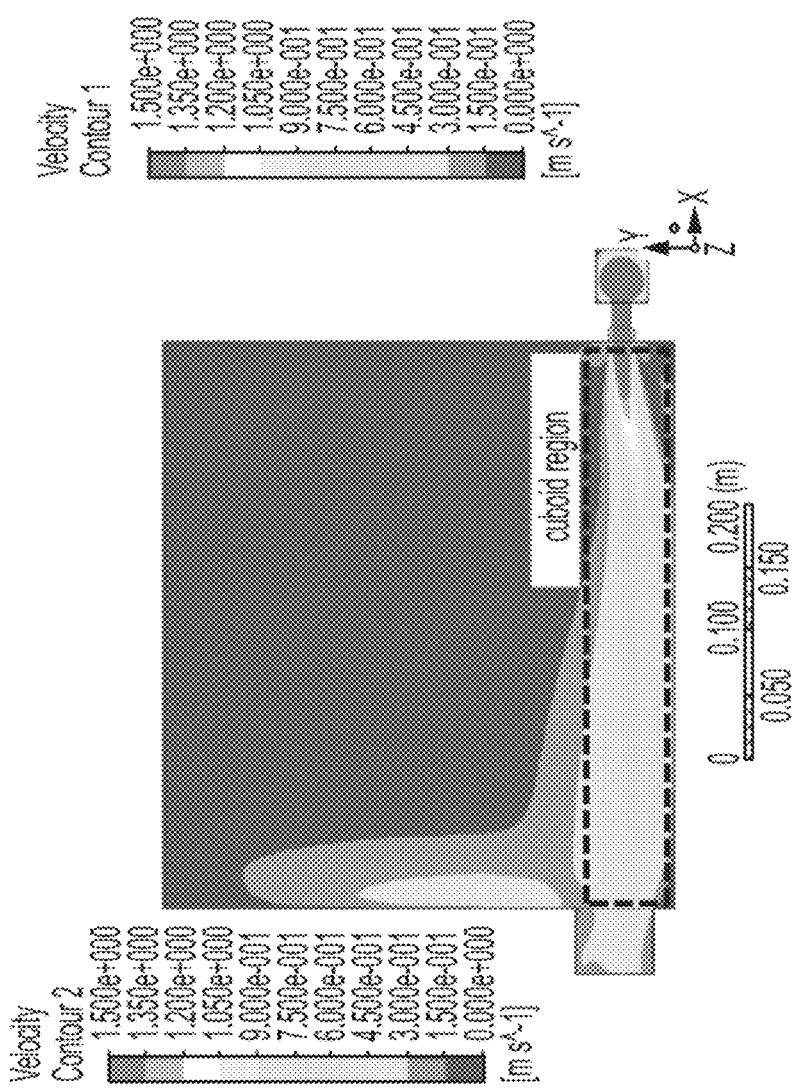
FIG. 5B
FIG. 5A

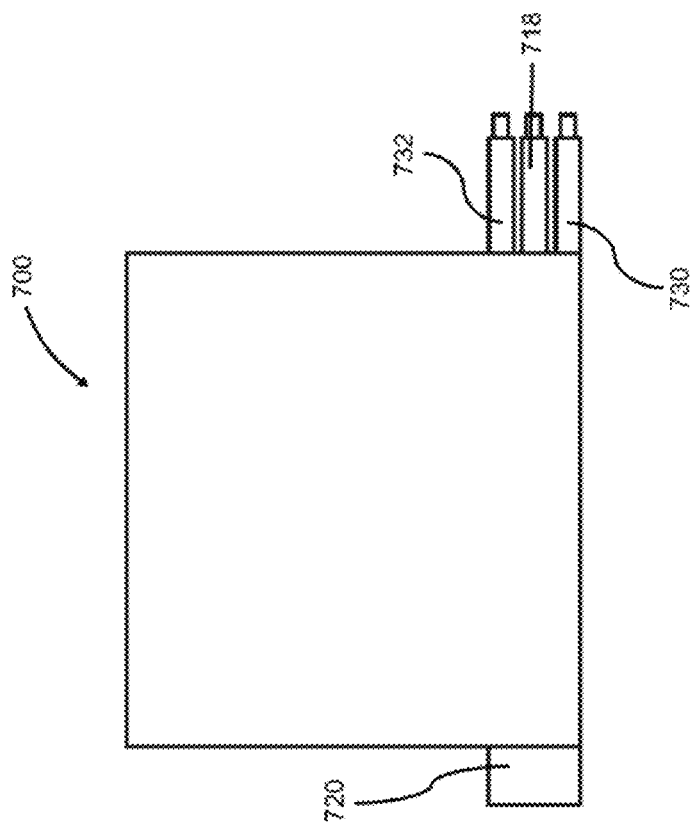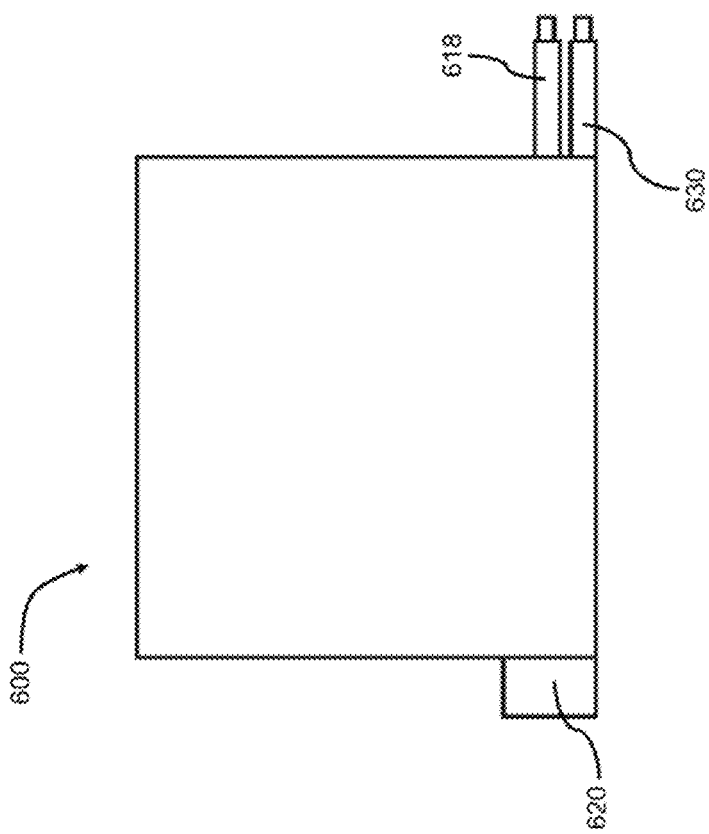

BUILD CHAMBER FOR USE IN POWDER BED-BASED LASER ADDITIVE MANUFACTURING PROCESSES

TECHNICAL FIELD

The present disclosure is generally directed to powder bed-based laser additive manufacturing chamber configurations, such as those used in selective laser melting applications. More specifically, the present disclosure relates to powder bed-based laser additive manufacturing build chambers that employ novel gas flow system designs configured to reduce generated-spatter contamination and enhance part quality.

BACKGROUND

Among metal additive manufacturing processes, selective laser melting (SLM) has attracted significant interest due to its potential to produce high-resolution and high-density parts from a variety of different metals and metallic alloys. In the SLM process, a high-energy laser beam is utilized to melt and fuse metallic powder materials. Often, high local temperatures associated with the SLM process environment can exceed the material evaporation point and cause evaporation. This vaporization process can cause a "vapor-jet" effect, which leads to the generation of emissions from the melt pool. Such emissions can include vaporization gases, powder particles within the vapor jet, and liquid droplets ejected from melt pool as a result of strong surface tension effects.

The ejected particles within the emissions—i.e., the vapor-jet powder particles and the liquid droplets from the melt pool are commonly referred to as "spatter." Such spatter can be re-deposited on the powder bed contaminating the build area of the SLM build chamber and thereby poses a risk of adversely affecting the build quality of the resultant part. Accordingly, to reduce the build-quality risks associated with ejected particles and droplets, effective design and implementation of spatter control and removal processes are necessary.

SUMMARY

In at least one embodiment, a powder-bed based additive manufacturing apparatus is disclosed. The apparatus may include a build plate configured to support a powder bed comprised of powder particles and a laser assembly configured to direct a laser beam at the powder bed to create a part from the powder particles. The powder-bed based additive manufacturing apparatus may further include a gas inlet channel configured to create a gas flow over the powder bed to entrain spatter particles created from the powder particles by the laser beam. The apparatus may also include an outlet channel configured to outlet the entrained spatter particle gas flow, the outlet channel having a lower outlet surface positioned between 0 and 10 mm above the build plate, wherein the gas inlet channel and the outlet channel are configured to entrain and to outlet at least 85 percent of the spatter particles.

In at least another embodiment, a powder-bed based additive manufacturing apparatus is disclosed. The apparatus may include a build plate configured to support a powder bed comprised of powder particles and a laser assembly configured to direct a laser beam at the powder bed to create a part from the powder particles, the laser beam creating spatter particles from the powder particles. The powder-bed based additive manufacturing apparatus may further include a first gas inlet channel configured to create a first gas flow over the powder bed to entrain spatter particles to generate an entrained spatter particle gas flow and a second gas inlet channel positioned between 5 and 55 mm below the first gas inlet channel and configured to create a second gas flow over the powder bed. The apparatus may also include an outlet channel configured to outlet the entrained spatter particle gas flow, wherein the first gas inlet channel, the second gas inlet channel, and the outlet channel are configured to entrain and to outlet at least 85 percent of the spatter particles.

In still yet another embodiment, a selective laser melting apparatus is disclosed. The apparatus may include a build plate configured to support a powder bed comprised of powder particles and a laser assembly suitable for creating a part from the powder particles within the selective laser melting apparatus, the laser assembly creating spatter emissions from the powder particles. The selective laser melting apparatus may further include a primary gas inlet channel having an array of inlet nozzles positioned along its length, wherein the primary gas inlet channel is configured to create a gas flow over the powder bed to entrain spatter emissions to produce an entrained emissions gas how and each inlet nozzle has a length of between approximately 20 and 150 mm. The apparatus may also include an outlet channel configured to outlet the entrained emissions gas flow, wherein the primary gas inlet channel and the outlet channel are configured to entrain and to outlet more than 85 percent of the spatter particles.

BRIEF DESCRIPTION OF THE DRAWINGS

FIGS. 5A and 5B show perspective views of the gas velocity contours within an SLM chamber;

FIGS. 12A and 12B depict example SLM chamber and gas flow system configurations in accordance with various disclosed embodiments;

DETAILED DESCRIPTION

Figure 1:
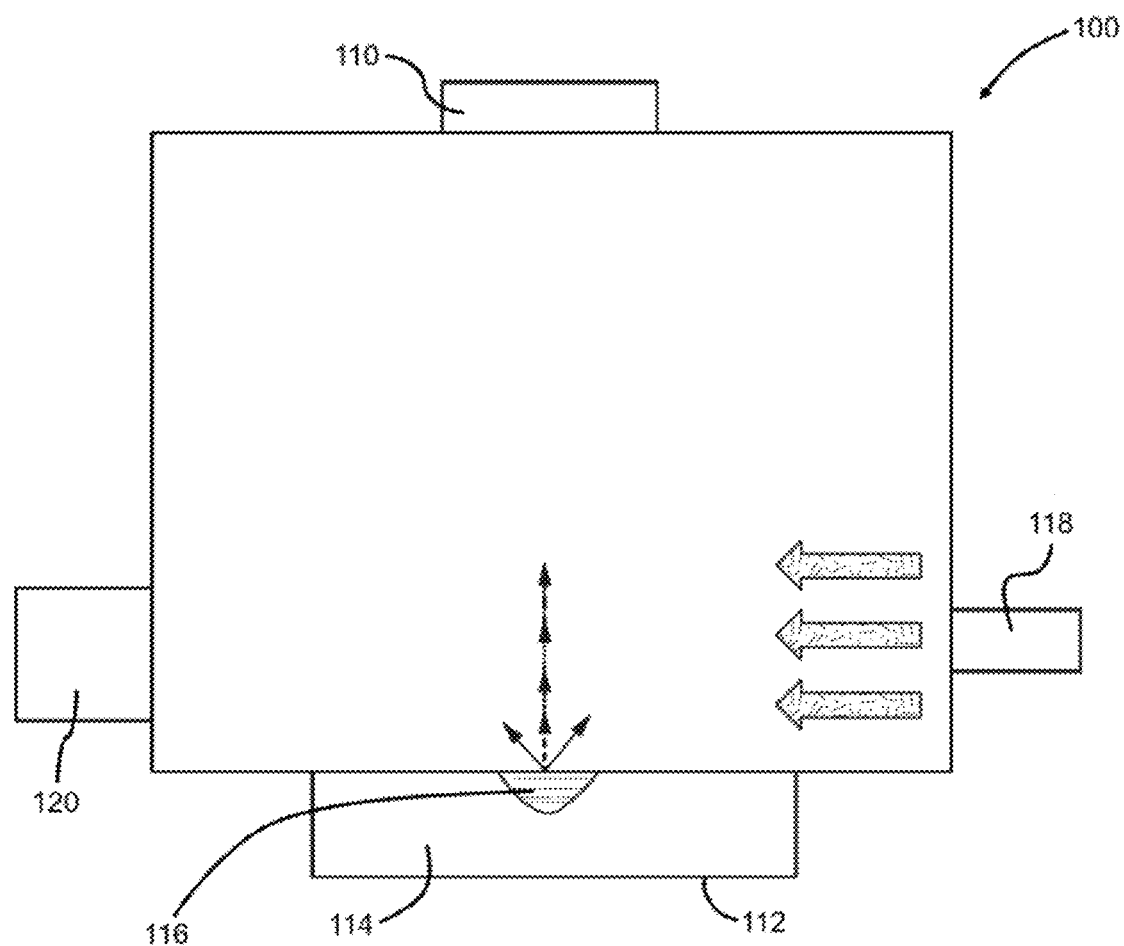
FIG. 1 depicts a non-limiting example of an SLM build chamber and associated gas flow system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within 0%, 0.5%, 1%, 2%, 3%, 4%, 5%, or 10% of the value or relative characteristic.

Given the significant potential of selective laser melting (SLM) technology to a variety of different industries and the complications inherent in its process environment, there is a need to understand, model, and address material vaporization and associated particle emissions to reduce their negative effects. The present disclosure sets forth designs and processes for efficiently removing emissions from and around the moving melt pool of the SLM build chamber, thereby reducing the potential damage to build quality posed by contamination from generated spatters. While many of the examples set forth herein describe SLM chamber designs and configurations, those of ordinary skill in the art will understand that such designs and configurations can also be effectively applied to various types of powder bed-based additive manufacturing devices.

While shielding gas flow can positively assist the removal of ejected particles within an SLM build chamber, the efficiency of such techniques is dependent upon the design and optimization of the gas flow system utilized. SLM build chamber designs in conjunction with applied gas flow system configuration and optimization have not been extensively investigated in the literature. Useful investigation of such interactions requires accurate models and understanding of a number of variables and effects including, but not limited to, spatter parameters such as spatter count, diameter, and velocity. Recognition of how these parameters vary based on different scanning speeds and laser powers is also important to the design, development, and implementation of efficient SLM chamber gas flow systems. KM gas chamber design is further complicated by a number of other dynamics that emerge within the SLM environment. These include increased spatter concentration near the outlet of the SLM chamber and non-uniform gas flow leading to another region of increased spatter concentration in the center of the build plate. Further complication is posed by the phenomenon of the downward gas flow tendency known as the Coanda effect.

In accordance with the present disclosure, improved gas flow systems—which enhance the removability of SLM process emissions—are described. These improved gas flow systems are capable of significantly reducing the amount of spatter without increasing the risk of blowing up powder bed particles. To achieve such results, the disclosed configurations and methods have been designed in view of the numerous factors and complications inherent in the environment of the SLM chamber. Computational fluid dynamics (CFD) models and finite volume method (FVM) simulations have been used to develop the SLM gas flow systems described. Such models and simulations have been used to better capture the complicated gas flow behavior dynamics within the build chamber. To accurately simulate spatter generation within the chamber, discrete phase model (DPM) simulations have also been used. Finally, the disclosed designs and configurations were also developed based on the fully coupled fluid-particle interaction method, which was used to precisely capture the influence of gas flow on solid particles within the chamber.

A non-limiting example of an SLM build chamber and associated gas flow system is depicted in FIG. 1. SLM chamber 100 includes laser assembly 110 above build platform 112. Powder bed 114 in which the resultant part is fabricated through the SLM process includes melt pool 116. SLM chamber 100 also includes gas flow inlet channel 118 opposite gas flow outlet 120. As will be understood, gas flow inlet channel 118 may include one or more gas flow inlet nozzles. Additionally, gas flow outlet 120 may be generally referred to as an outlet channel or simply an outlet. A flow of inert gas—such as Argon, for example—is used to remove the spatter from build platform 112 of SLM chamber 100. The flow of inert gas is generally depicted by the arrows near gas flow inlet channel 118 in FIG. 1. As represented by the arrows, the flow of gas is generally directed away from gas flow inlet channel 118 and toward gas flow outlet 120. This inert gas flow provides a drag force on the spatter particles emitted above powder bed 114 and melt pool 116. The general trajectories of SLM emissions, including the emitted spatter particles, are depicted in FIG. 1 by the arrows above melt pool 116. The removability of such SLM emissions is dependent upon the characteristics of the inert gas flow enabled by the gas flow system of SLM chamber 100.

In accordance with various embodiments disclosed herein, the gas flow system of the SLM chamber can be designed to markedly enhance the removability of the SLM emissions. The percentage of spatter removed from of the build area in comparison to the total amount of generated spatters is referred to as the clear rate. The clear rate of generated-spatter contamination is improved, for example, by gas flow system configurations in which the gas flow outlet is lowered toward the substrate, the gas flow inlet channel length is increased, uniform gas flow is enabled using multi-channeled pumps, and/or one or more supplementary gas inlet flows are introduced to the chamber design.

Figure 2B:
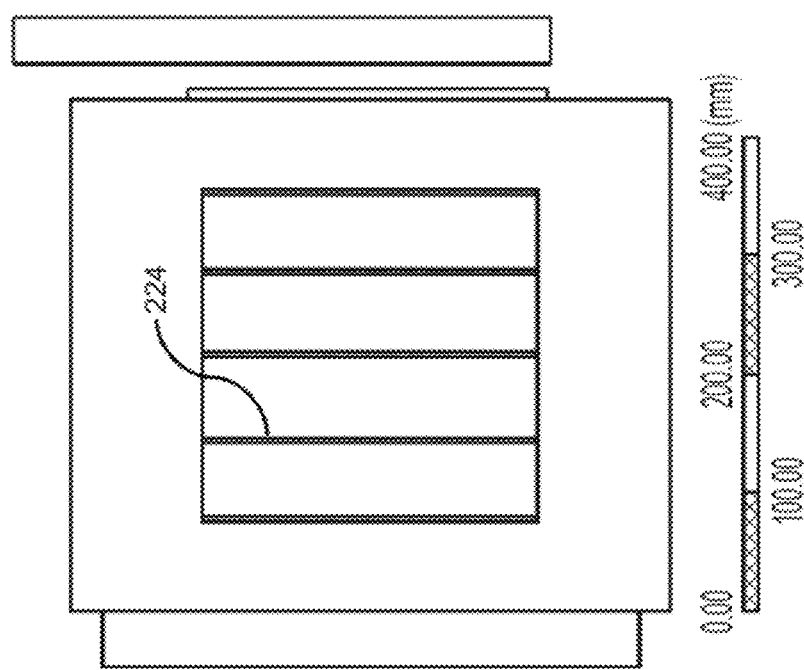
FIGS. 2A and 2B show perspective views of a general SLM build chamber configuration.
Figure 2A:
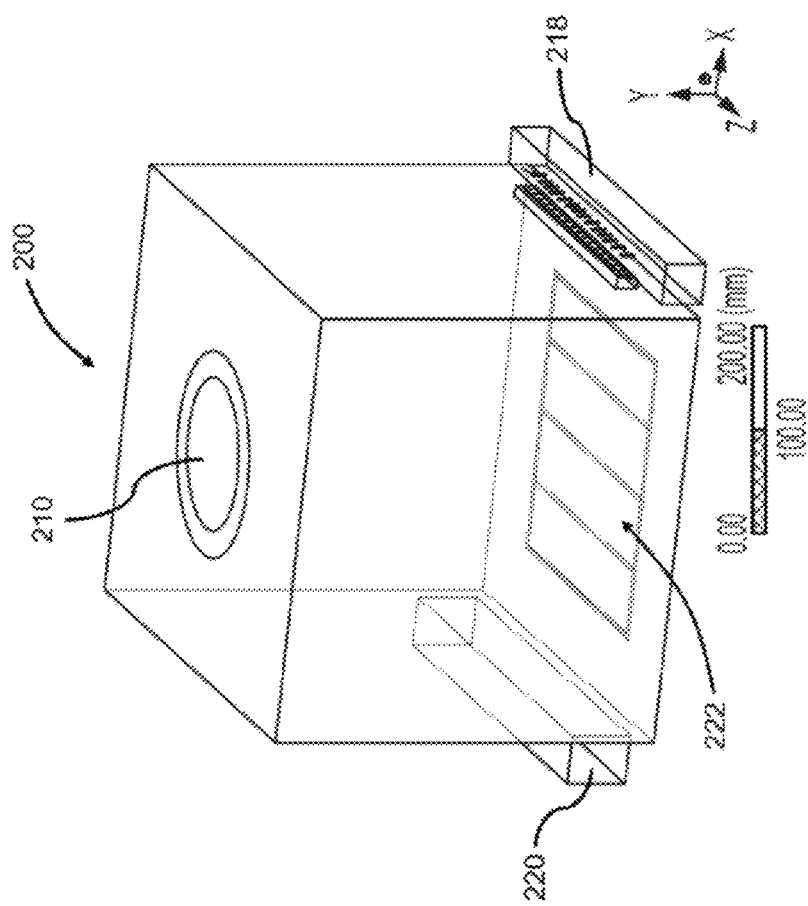

FIGS. 2A and 2B show perspective views of a general SLM build chamber configuration such as, for example, the SLM build chamber configuration set forth in FIG. 1. As with all figures accompanying this specification, the measurement scales that appear below FIGS. 2A and 2B are only examples. As will be understood by those of skill in the art, the chamber configuration designs described throughout this specification can be employed at a variety of different scales. FIG. 2A specifically depicts a non-limiting example of SLM chamber 200 including the location of laser assembly 210 above build area 222 positioned between gas flow inlet channel 218 and gas flow outlet 220. FIG. 2B depicts the general configuration of SLM chamber 200 from a perspective directly above build area 222. As described in detail below, a model of the generation and emission of spatter within an SLM chamber such as SLM chamber 200 may include spatter generation lines 224, oriented normal to the gas flow, from which spatter is randomly ejected from the surface of the build plate.

Figure 3:
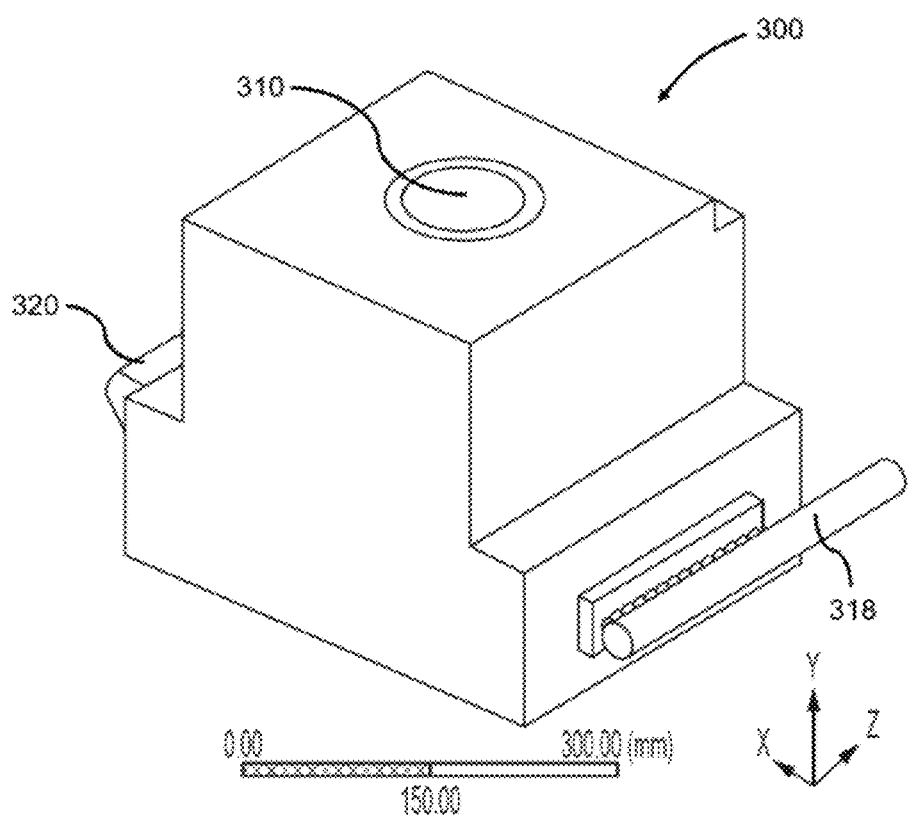
FIG. 3 depicts another example of a perspective view of a general SLM build chamber configuration.

Similarly, FIG. 3 depicts another example of a perspective view of a general SLM build chamber configuration such as, for example, the SLM build Chamber configurations set forth in FIGS. 1, 2A, and 2B. Specifically, FIG. 3 shows the configuration of SLM Chamber 300 including laser assembly 310 and gas flow inlet channel 318 and gas flow outlet 320.

Accurate modeling techniques are required to properly assess gas flow and spatter conditions within an SLM chamber in order to design and develop novel chamber and gas flow system configurations—configurations which enhance the removability of SLM emissions and thereby improve the build quality of the fabricated part. In connection with such modeling techniques, computational fluid dynamics (CFD) methods may be used to calculate gas flow quantities and the discrete phase model (DPM) may be used to capture the relevant spatter generation characteristics. Additionally, coupled calculation of the discrete phase and the continuous phase may be used to model the interactions of the metallic particles and the inert gas continuous phase.

Examples—Modelling the SLM Environment

The SLM environment may be modelled by applying CFD methods in connection with gas flow characteristics and the discrete phase model to the generation and emission of spatter. As there are no time-dependent features the flow can be presumed to be steady state and incompressible. Additionally, the model assumes spatter is ejected from the build plate along straight lines spanning the build plate width of approximately 280 mm and oriented normal to the flow of inert gas. As shown in FIG. 2B, the model contemplates spatter randomly ejected from the build plate along five straight spatter ejection lines 224 spanning the width of build plate and oriented normal to the gas flow. The spatter generation lines represent emissions from the entire build plate. The spatter particles can be of varying particle diameters including, for example, diameters between approximately 10 and 100 μm. The spatter particles can also exhibit a variety of ejection speeds including, for example, speeds ranging from approximately 1.5 to 35 m/s. The model may further apply argon as the inert gas. In accordance with such a model, argon includes a density of 1.6228 kg m$^3$ and a dynamic viscosity of 2.1.25e-05 kg/m-s. The model further assumes the powder metallic material is 316L stainless steel having a density of 7950 kg/m$^3$.

Figure 4B:
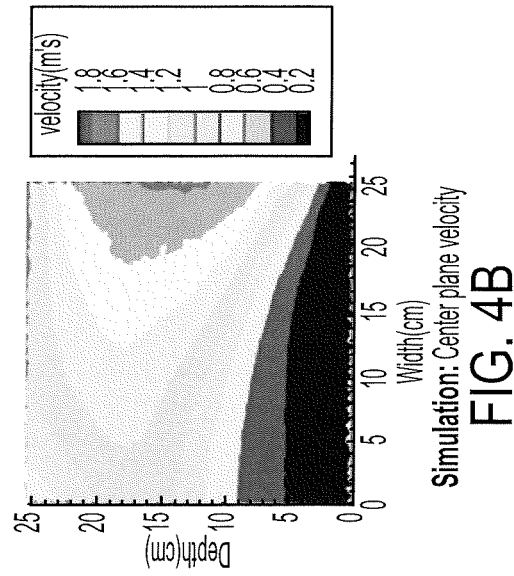
FIGS. 4A to 4D depict simulation and experimental results in connection with flow fields within the SLM chamber.
Figure 4D:
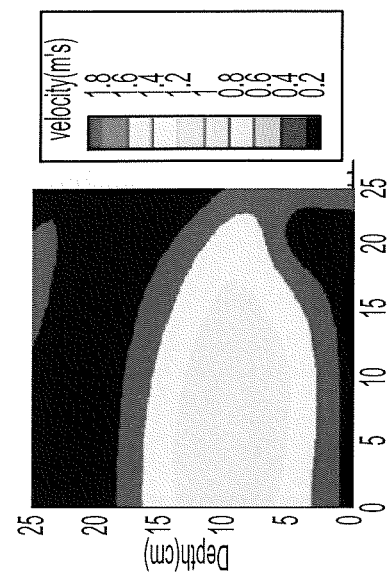
Figure 4A:
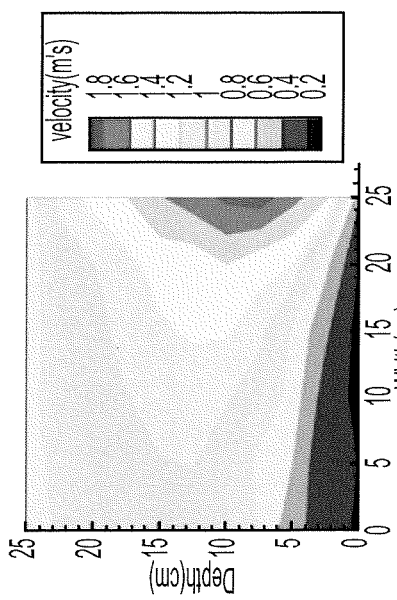
Figure 4C:
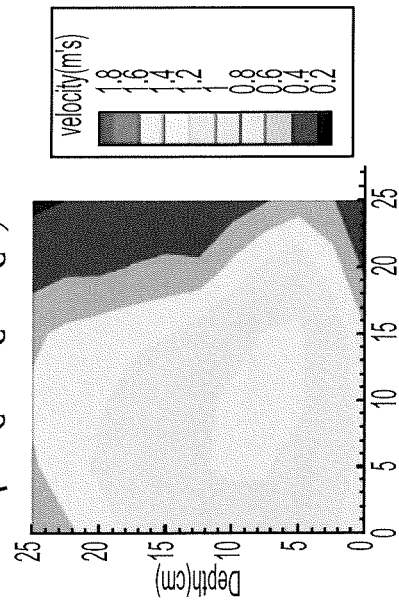

The simulation results based on this model are shown in FIGS. 4A to 4D in conjunction with experimentally observed results. The flow fields shown in FIGS. 4A to 4D demonstrate reasonable agreement between the simulation and experimental results. The experimental results shown in FIGS. 4A and 4C are from Philo, A. M., et al. "A study into the effects of gas flow inlet design of the Renishaw A M250 laser powder bed fusion machine using computational modelling," Solid Free, Fabr. (2017). As set forth in the paper, the experimental data provided in FIGS. 4A and 4C are based on the configuration and environmental dynamics of a Renishaw AM250 SUM machine and the velocity contours were measured using a series of hot wire anemometer (HWA) probes. For both the simulated model and the experiment, the center-plane was defined as 40 mm above the build plate and the base-plane was defined as 3 mm above the build plate. The center-plane velocity simulation data shown in FIG. 48 closely tracks the center-plane velocity experimental data shown in FIG. 4A. Similarly, base-plane velocity simulation data shown in FIG. 4D closely tracks the base-plane velocity experimental data shown in FIG. 4B.

If the velocity of the inert gas flow within the SLM chamber is too high, additional powder bed particles can be blown up. Local high gas velocities should be strictly limited in order to prevent such additional process complexities. In the simulation, local gas velocity is collected at the location that is 1 mm above powder bed. If the maximum local gas velocity exceeds threshold velocity, the related inlet flow rate—which is initially applied at the inlet of the build chamber—needs to be reduced. The threshold velocity at 1 mm above powder bed can be analytically calculated. For the location just at the powder bed surface, the threshold velocity is defined to describe the point at which powder bed particles start moving when exposed to a gas flow above the powder bed. Computations show that the threshold velocity at powder bed surface is approximately 0.27 m/s. To calculate the threshold velocity at different locations above powder bed, it is then correlated with the physical profile velocity by the log-law wind speed profile. The threshold velocity 1 mm above the powder bed, for example, can be computed as approximately 3.383 m/s. Accordingly, the powder bed particles will remain stationary if the gas velocity 1 mm above powder bed is less than 3.383 m/s.

Because the drag forces applied to the spatter particles by the flow of inert gas are tightly related to the gas properties and velocities, the gas flow field is of particular importance. Furthermore, a uniform velocity field directly above the powder bed is preferred for spatter removal. FIGS. 5A and 5B depict gas velocity contours associated with the initial SLM chamber design described above. The velocity contour data shown in FIG. 5A demonstrates that the gas flow primarily concentrates inside a cuboid region that is above the SLM chamber substrate and below the upper edge of the gas flow inlet/outlet. Additionally, the velocity contour data shown in FIG. 5B shows that the width of the gas flow generally matches width of the inlet/outlet. FIG. 5A further shows that there is a re-circulation flow present above the cuboid region. Although this initial gas flow system design can provide an acceptable flow field, certain unaddressed design problems impede the gas flow's ability to further remove spatter from the build area.

In accordance with one or more embodiments, the spatter contamination clear rate can be improved by a gas flow system configuration in which the gas flow outlet is lowered toward the SLM chamber substrate. In other embodiments, the spatter contamination clear rate can be improved by a gas flow system configuration in which the gas flow inlet channel length is increased. In still other embodiments, the spatter contamination clear rate can be improved by a gas flow system configuration in which uniformity of the gas flow is increased by utilizing multi-channeled pumps. In still yet other embodiments, the spatter contamination clear rate can be improved by a gas flow system configuration in which one or more supplementary gas inlet flows are introduced to the chamber design. These gas flow system design adjustments can be separately applied or combined in the same SLM chamber configuration in order improve the gas flow field and resultant spatter removal. Such adjustments can reduce the risks of emissions-related part quality degradation.

Figure 6A:
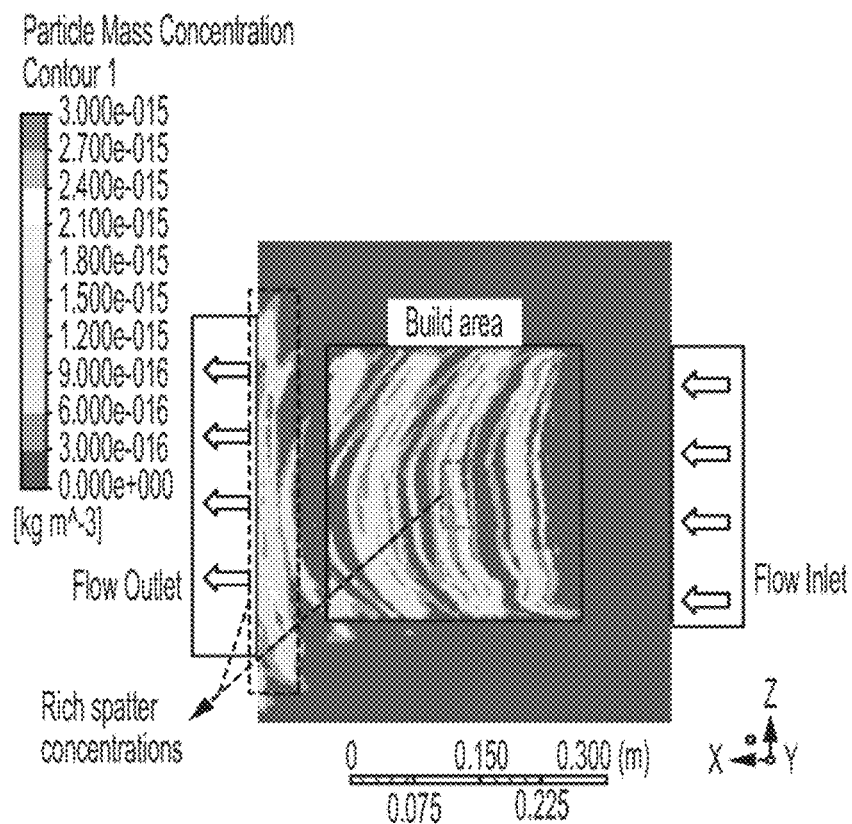
FIGS. 6A and 6B show maps of the simulated spatter re-deposition and the gas velocity contours right above the powder bed of an SLM chamber.
Figure 6B:
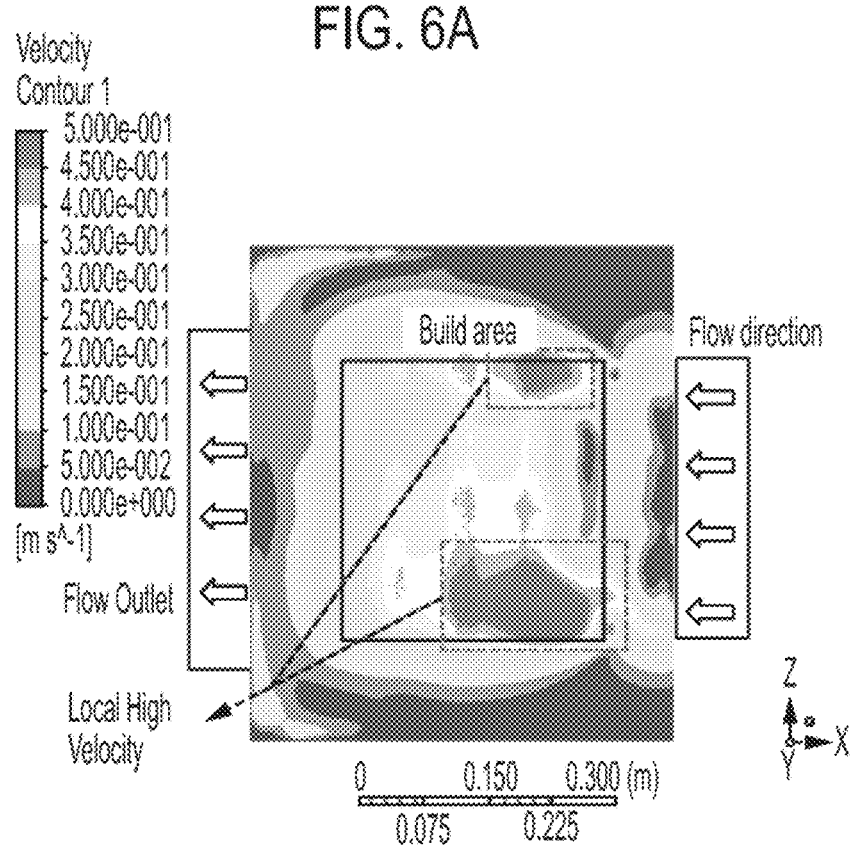

Unremoved spatter can fall to the build bed and redeposit. Simply increasing the velocity of the gas flow increases the risk of blowing up new stationary powders. To avoid such risks, the gas flow 1 mm above the powder bed should not exceed the critical threshold velocity value. FIGS. 6A and 6B respectively depict maps of the simulated spatter re-deposition and the gas velocity contours right above the powder bed. As shown in FIG. 6A, there are two regions of increased spatter concentrations inside the chamber. The first region is located on the substrate near the chamber outlet. This is due to the configuration of the SLM chamber. Since the bottom of the gas outlet is higher than the build plate, the outlet at least partially blocks the outgoing flow of spatter leading to the increased concentrations near the outlet. The second region of increased spatter concentration is within the build area itself near the center of the build plate. This region of increased spatter concentration results from non-uniform gas flow within the SLM chamber. FIG. 6B shows the velocity contours and non-uniform gas flow within the chamber at 1 mm above the powder bed. As demonstrated by the velocity contours within the figure, there are two high velocity regions. Particle blow up within these regions is likely if the typical flow rate (commonly about 250 L/min) is increased without modifying the configuration of the SLM chamber and gas flow components.

Figure 7A:
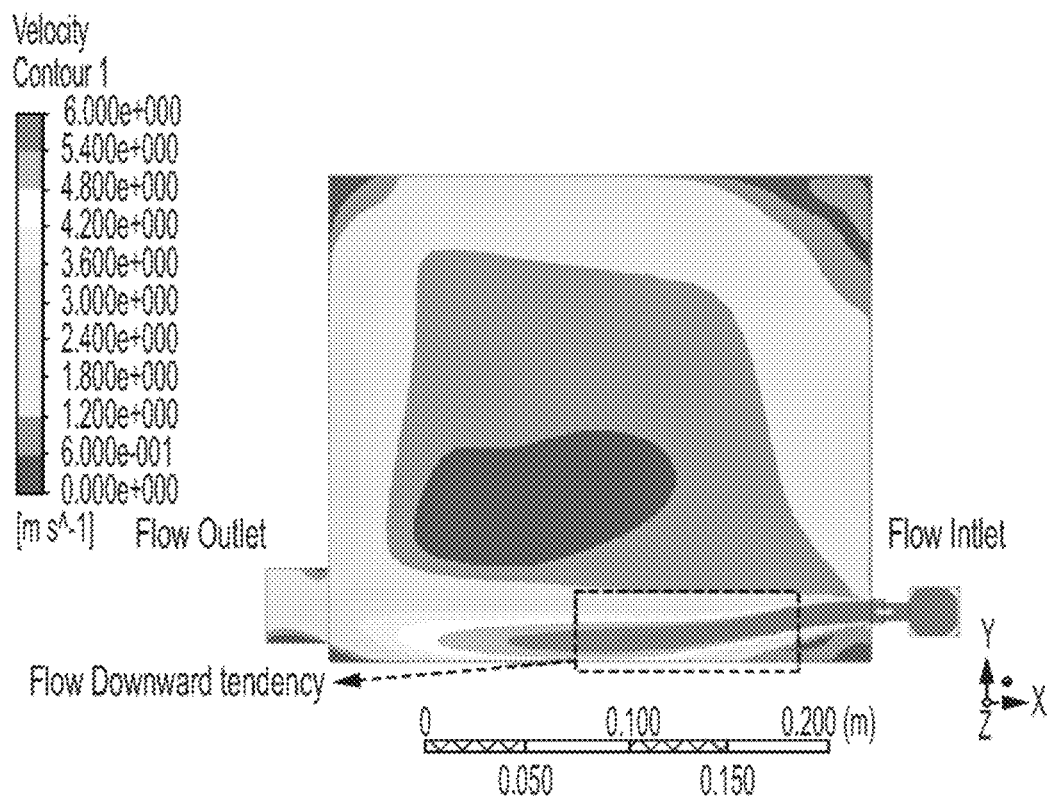
FIGS. 7A and 7B are graphs showing the gas flow and spatter emission trajectory that results from the Coanda effect within an SEM chamber.
Figure 7B:
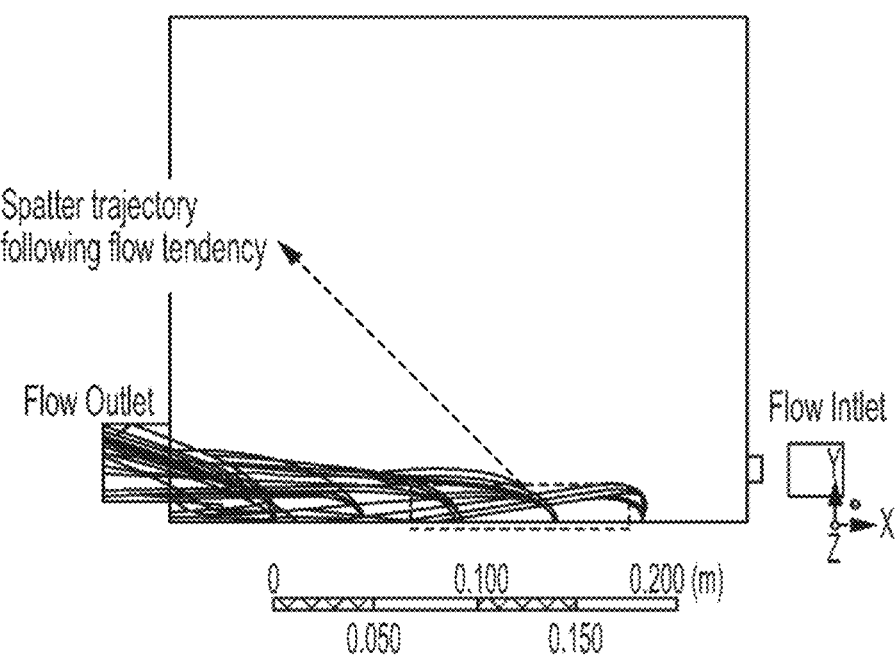

In addition to local areas of increased spatter concentration and increased gas velocity, typical SLM chamber and gas flow system designs also exhibit a downward gas flow tendency known as the Coanda effect. The combination of these factors can lead to an observed clear rate of less than 50% under normal conditions. A clear rate of 50% or less is generally insufficient for the fabrication of high-quality engineering components. Increasing the flow rate can only improve the clear rate to a certain extent and, of course, risks particle blow up. This limitation is a consequence of the flow downward tendency (i.e., the Coanda effect), as shown in FIG. 7A. With higher flow rates, the gas flow velocity and the drag force imposed on the spatter particles increases proportionally. Based on the force balance of the spatter, the spatter becomes more likely to follow the direction of the gas flow as the flow rate is increased. As shown in FIG. 7B, a flow rate of 1500 L/min, for example, leads to a spatter trajectory that is nearly identical to the downward flow tendency.

Figure 8A:
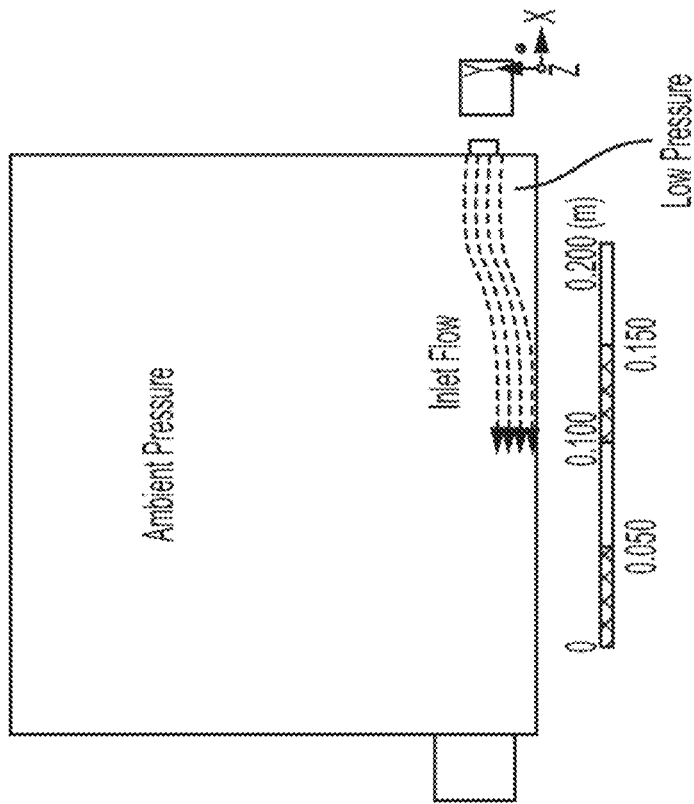
FIGS. 8A and 8B graphically depict the conditions that produce the Coanda effect in an SLM chamber.
Figure 8B:
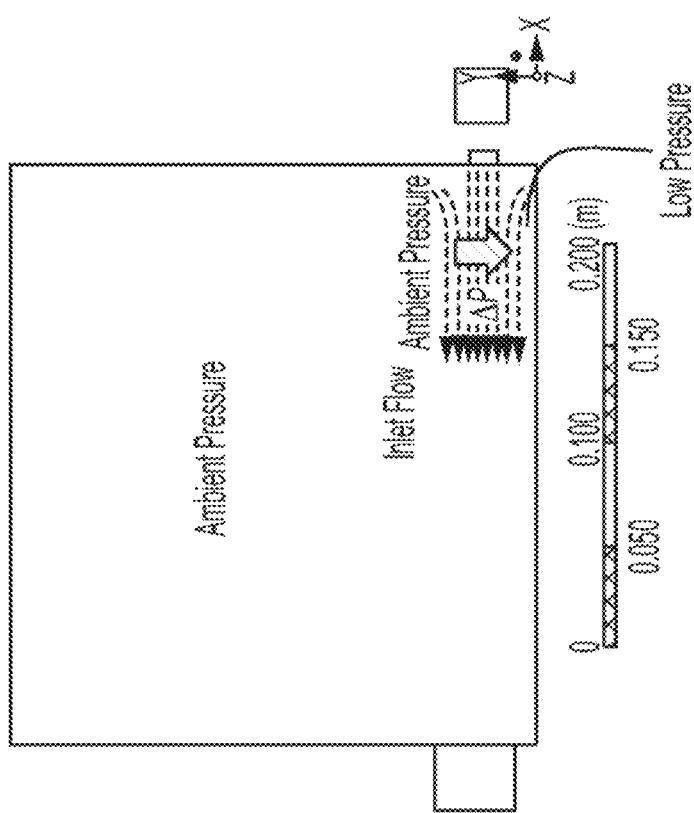

FIGS. 8A and 8B graphically depict the conditions that produce the Coanda effect in the SLM chamber. The incoming gas flow from the inlet jets entrains air close to the inlet jets. This entrainment results in a pressure reduction near the inlet jets. The low-pressure region above the inlet jets are exposed to the entire SLM chamber. Accordingly, this region can be quickly filled and approximately reaches ambient pressure. The region below the inlet jets is constrained by the substrate, and a low-pressure region is produced. The pressure difference across the gas flow in the vertical direction causes the flow to turn downwardly.

Figure 9B:
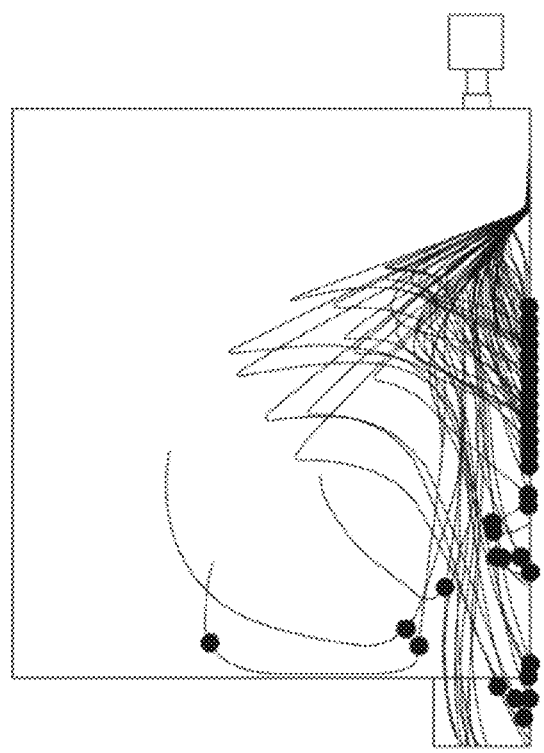
FIGS. 9A and 9B respectively depict an example of a perspective view of a general SLM build chamber configuration and spatter emission trajectory in connection therewith.
Figure 9A:
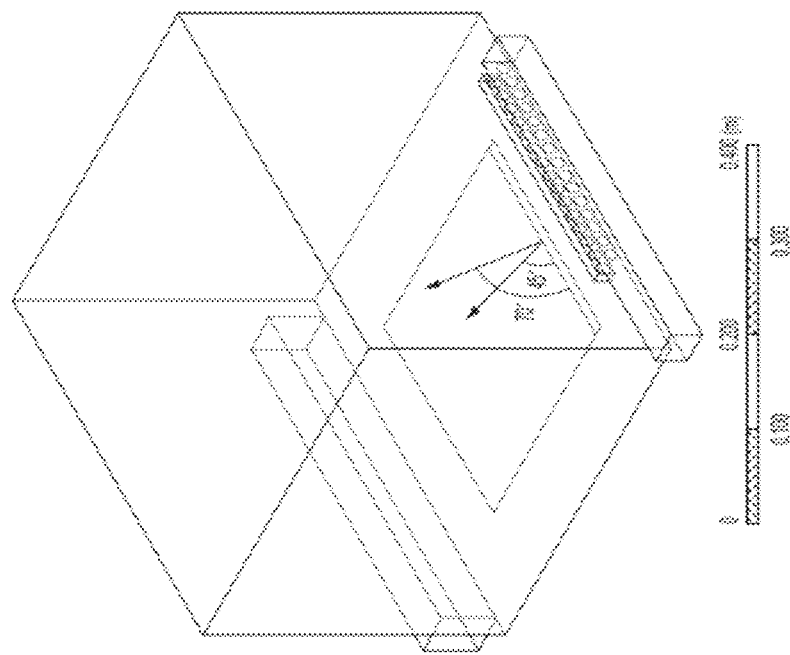

An effective model of the SLM environment may also contemplate a different spatter source location and ejection trajectory. As shown in FIG. 9A, for example, rather than assuming spatter is ejected from the build plate along straight lines spanning the build plate width, the model may assume spatter is ejected away from the inlet channel at an angle of between approximately 45° to 70° above the plane of the build surface. In accordance with such a model, simulated spatter trajectories within the chamber are depicted in FIG. 9B.

Figure 10B:
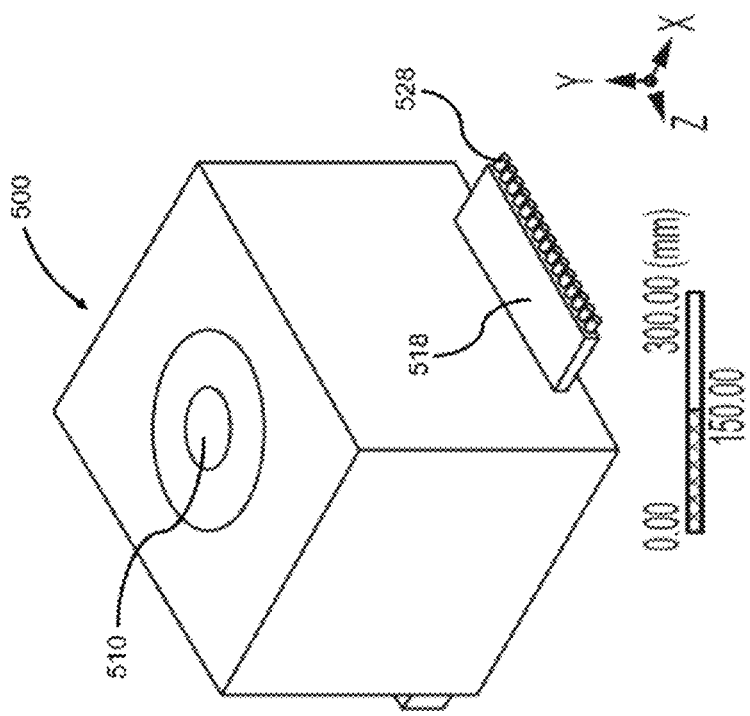
FIGS. 10A and 10B depict example SLM chamber and gas flow system configurations in accordance with various disclosed embodiments.
Figure 10A:
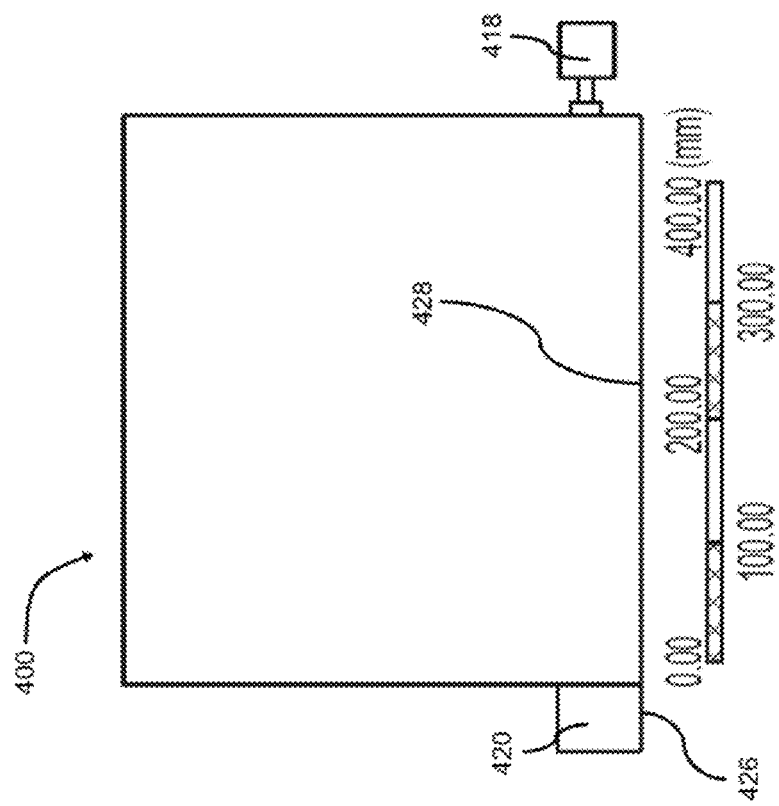

Positioning the gas flow outlet above the build plate (i.e., the substrate)—as is common in existing SLM chamber design—introduces an obstacle to spatter that may otherwise escape the build area. Higher spatter concentration near the outlet can be addressed by lowering the bottom of the outlet to the height of build plate. In accordance with certain embodiments, the gas flow outlet may be lowered to the same level as the substrate surface, such that there is no vertical displacement between the two. A representative example of such a configuration is shown in FIG. 10A, which shows a sideview of SLM chamber 400 including gas flow inlet channel 418 and gas flow outlet 420. As shown in the figure, the bottom portion 426 of gas flow outlet 420 is positioned at approximately the same vertical position as substrate surface 428. In at least another embodiment, the gas flow outlet may be lowered such that its lower surface is positioned at approximately the same vertical position as the substrate. In other embodiments, the gas flow outlet may be lowered such that its lower surface is positioned between approximately 0 and 10 mm above the substrate surface. In still other embodiments, the gas flow outlet may be lowered such that its lower surface is positioned between approximately 10 and 30 mm above the substrate surface.

The complications associated with non-uniform gas flow—which is shown in FIG. 61B—can be addressed by extending the nozzles associated with the gas inlet channels and providing uniform flow across all the channels and associated jets. In accordance with certain embodiments, the gas inlet channel nozzles may be between approximately 20 mm and 1.50 mm in length. In other embodiments, the gas inlet channel nozzles may be between approximately 50 mm and 120 mm in length. In still other embodiments, the gas inlet channel nozzles may be between approximately 80 mm and 110 mm in length. Substantially uniform flow can further be achieved by using multi-channel pumps. A representative example of an SLM chamber and gas flow system configuration in such embodiments is shown in FIG. 10B. FIG. 10B depicts a perspective view of SLM chamber 500 including laser assembly 510 and gas flow inlet channel 518 having a plurality of extended gas inlet channel nozzles 528.

Figure 11A:
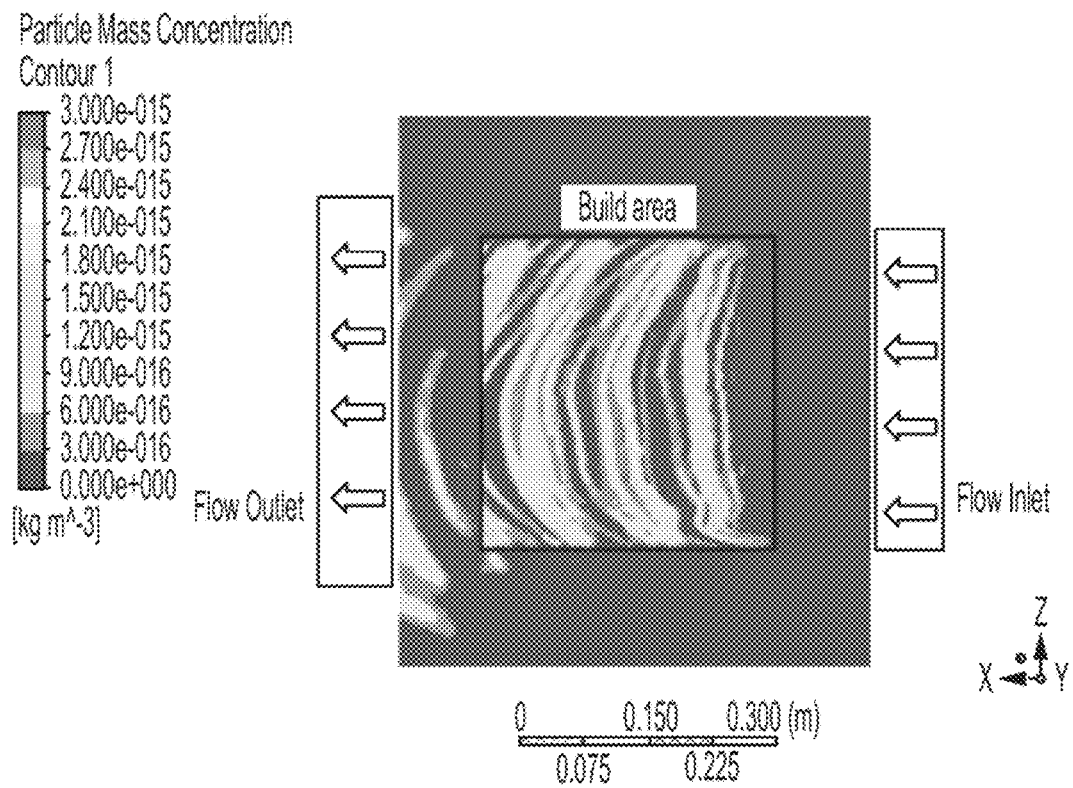
FIGS. 11A and 11B respectively show examples of a spatter re-deposition map and the gas velocity contours of SLM chamber and gas flow system configurations in accordance with various disclosed embodiments.
Figure 11B:
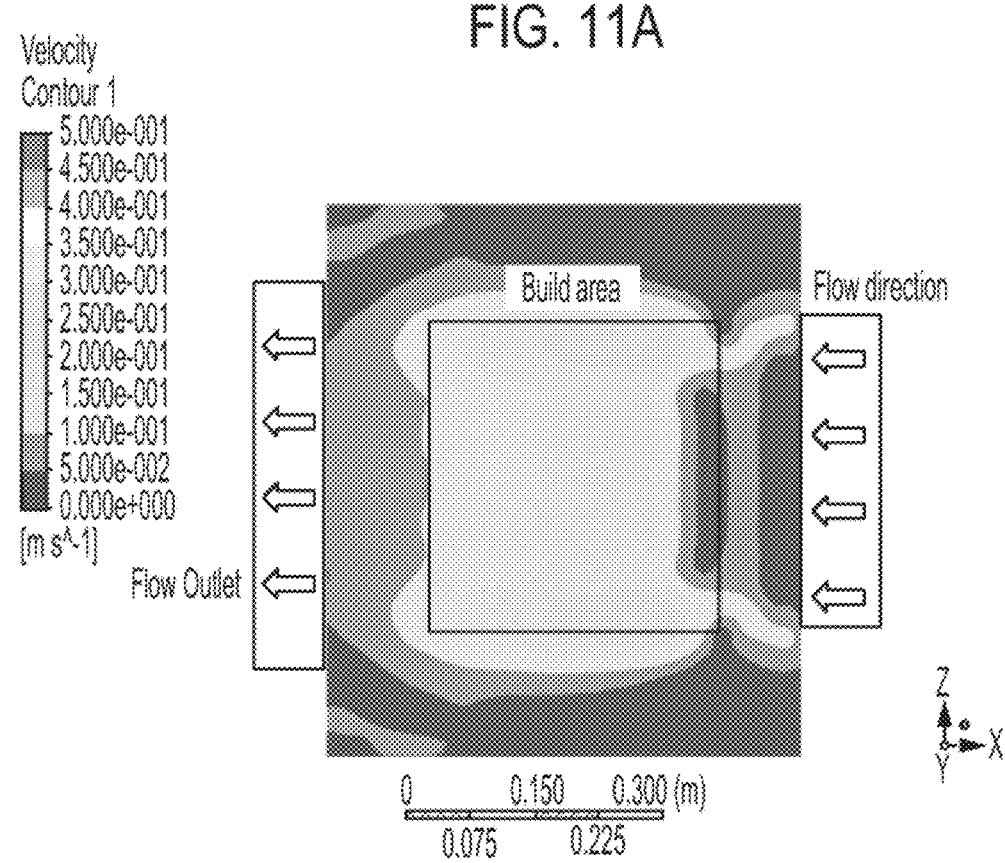

FIG. 11A depicts a non-limiting example of the spatter re-deposition map of a chamber design incorporating a lowered outlet height and a gas flow rate of approximately 250 L/min. As shown, the increased spatter concentration near the outlet has been removed. FIG. 11B which shows the gas velocity contours at 1 mm above the powder bed—demonstrates that by making the inlet gas flow more uniform, the local region of increased spatter concentration in the middle of the build area can also be removed. Modifying the inlet design to provide a more uniform gas flow leads to a more uniform flow field near the powder bed. Such a modification may lower the risk of blowing up powder bed particles. Additionally, such a design increases the flow rate limitation so that the gas flow rate may be increased to between approximately 750 and 1500 L/min without exceeding critical threshold velocity at 1 min above the powder bed.

In one or more embodiments, the gas flow system of an SLM chamber may be configured such that at least one supplementary gas inlet channel is provided below the primary gas inlet channel. A representative example of such a configuration is shown in FIG. 12A, which depicts a sideview of SLM chamber 600 including primary gas flow inlet channel 618 and outlet 620. As shown in FIG. 12A, SLM chamber 600 further includes a supplementary gas flow inlet channel 630 below primary gas flow inlet channel 618. Such a configuration may be referred to as a dual-inlet design. In accordance with other embodiments, at least one supplementary gas inlet channel is provided below the primary gas inlet channel and at least one supplementary gas inlet channel is provided above the primary gas inlet channel. A representative example of such a configuration is shown in FIG. 12B, which depicts a sideview of SLM chamber 700 including primary gas flow inlet channel 718 and outlet 720. As shown in the figure, SLM chamber 700 further includes a first supplementary gas flow inlet channel 730 below primary gas flow inlet channel 718 and a second supplementary gas flow inlet channel 732 above primary gas flow inlet channel 718. Such a configuration—including a supplementary gas flow inlet channel both above and below a primary gas flow inlet—may be referred to as a tri-inlet design.

System configurations including such primary and supplemental gas flow inlets each of which may comprise one or more inlet nozzles—can be utilized to reduce the Coanda effect that results in the vertical pressure differential leading to the downward flow within the SLM chamber. By either lowering the pressure on the upper side of the flow or raising the pressure on the lower side of the flow, the downward flow tendency can be eliminated. When a continuous gas flow is supplied through one or more supplementary inlets positioned below the primary gas inlet channel(s), the low pressure zone can be increased to the ambient level. Similarly, at least one supplementary gas flow provided both above and below the primary gas inlet channel(s) allows for similar adjustments to the local pressure regions resulting in the negation of the Coanda effect.

In at least one embodiment, a supplementary gas inlet channel is provided between approximately 5 and 55 mm below the primary gas inlet channel. In another embodiment, a supplementary gas inlet channel is provided between approximately 15 and 40 mm below the primary gas inlet channel. In still another embodiment, a supplementary gas inlet channel is provided between approximately 20 and 30 mm below the primary gas inlet channel.

In at least one embodiment, a first supplementary gas inlet channel is provided between approximately 5 and 55 mm below the primary gas inlet channel and a second supplementary gas inlet channel is provided between approximately 5 and 55 mm above the primary gas inlet channel. In other embodiments, a first supplementary gas inlet channel is provided between approximately 15 and 40 mm below the primary gas inlet channel and a second supplementary gas inlet channel is provided between approximately 15 and 40 mm above the primary gas inlet channel. In still other embodiments, a first supplementary gas inlet channel is provided between approximately 20 and 30 mm below the primary gas inlet channel and a second supplementary gas inlet channel is provided between approximately 20 and 30 mm above the primary gas inlet channel.

Figure 13A:
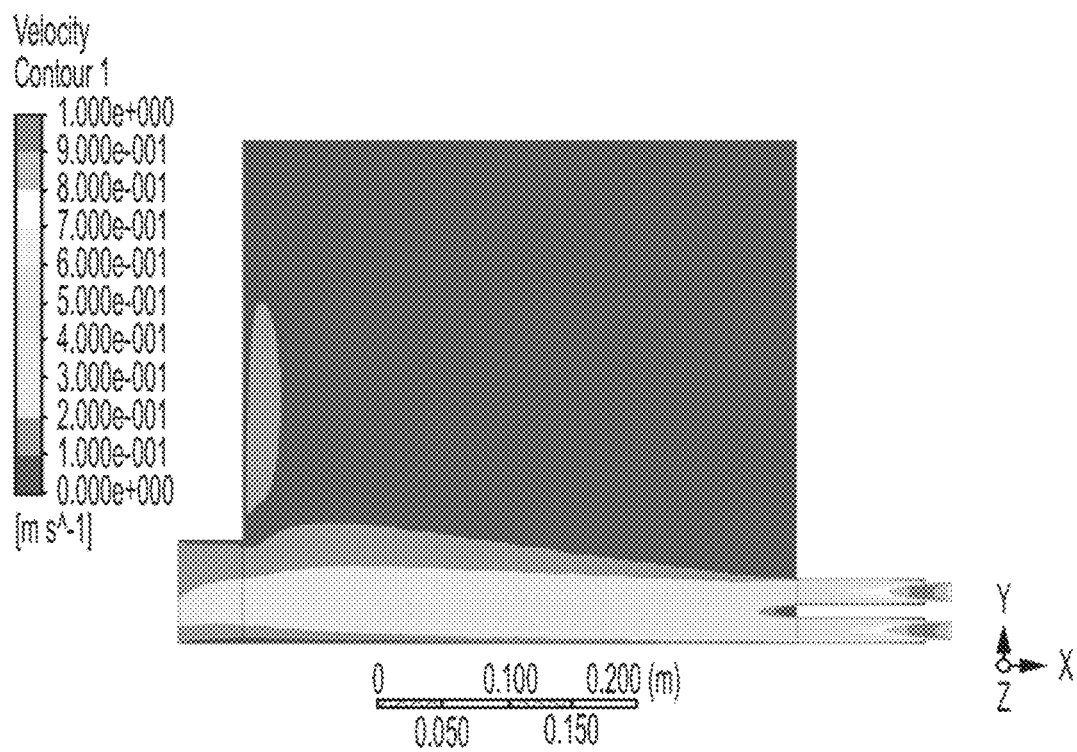
FIGS. 13A and 13B respectively show examples of gas flow trajectories for SLM chamber and gas flow system configurations in accordance with various disclosed embodiments.
Figure 13B:
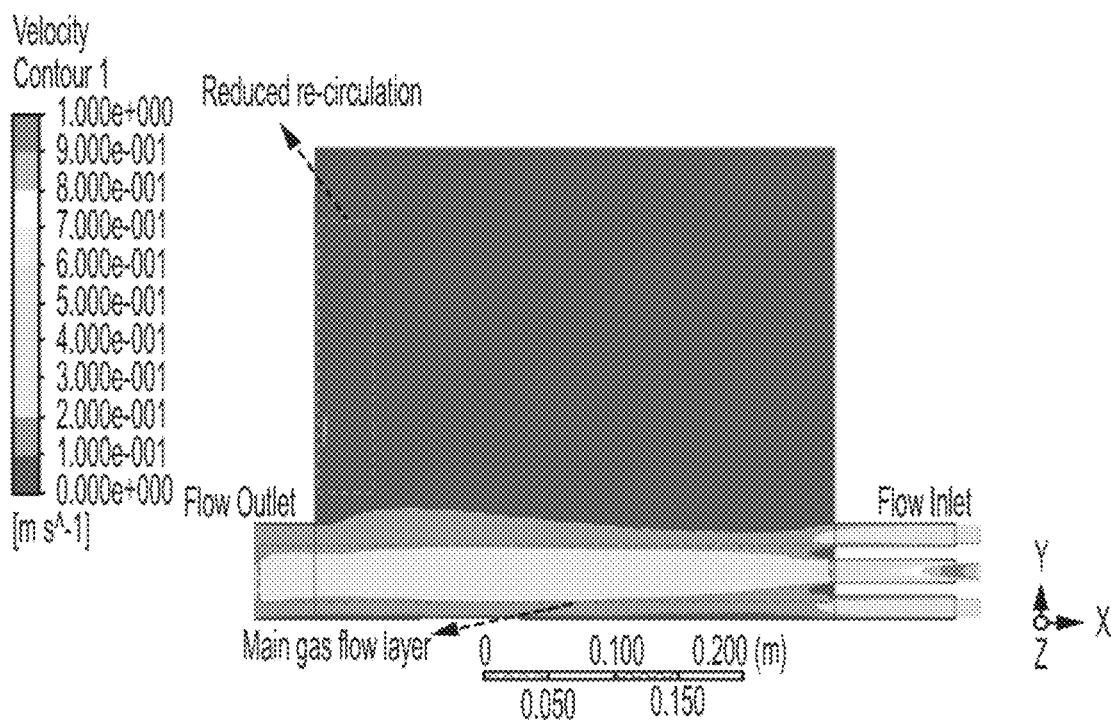

The flow rates from the supplementary inlets can be less than, equal to, or higher than the flow rate of the primary inlet. The flow rate value for these multiple flow designs is the flow rate summation of both the primary and the supplementary gas inlets. Varying flow rate can provide different efficiencies. In certain embodiments, the flow rate from the lower supplementary inlet is between 25% and 200% of the primary inlet flow rate. In some embodiments, the flow rate from the lower supplementary inlet is between 25% and 100% of the primary inlet flow rate and the flow rate from the higher supplementary inlet is between 25% and 100% of the primary inlet flow rate. Simulated velocity contours of the gas flow system configurations employing supplementary gas inlets are shown in FIGS. 13A and 13B. As these figures demonstrated, the downward flow tendency can be eliminated through the application of these designs.

Figure 14A:
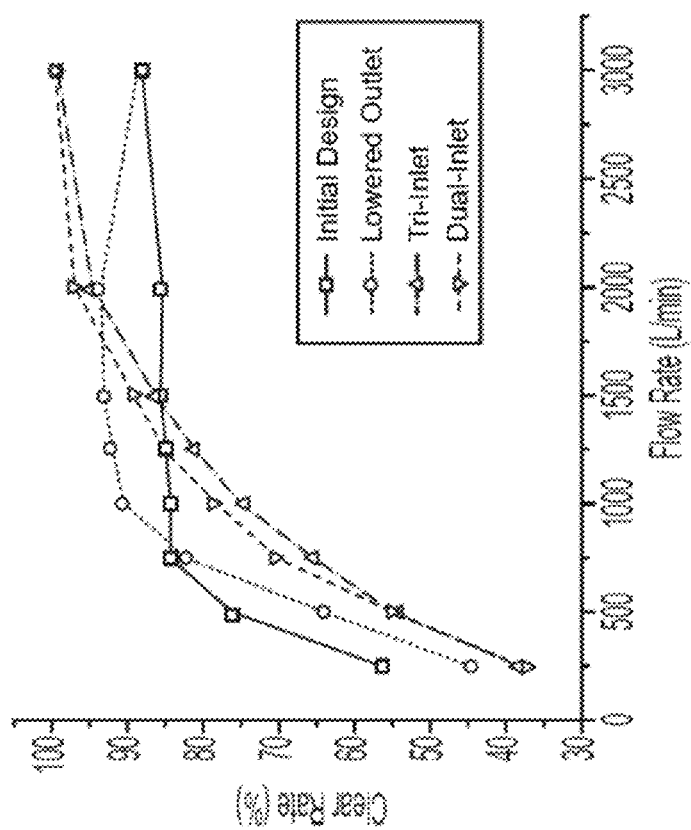
FIGS. 14A and 14B depict graphs showing the clear rate of generated-spatter contamination and maximum gas flow velocity at 1 mm above an SLM build plate as a function of flow rate in accordance with various disclosed embodiments.
Figure 14B:
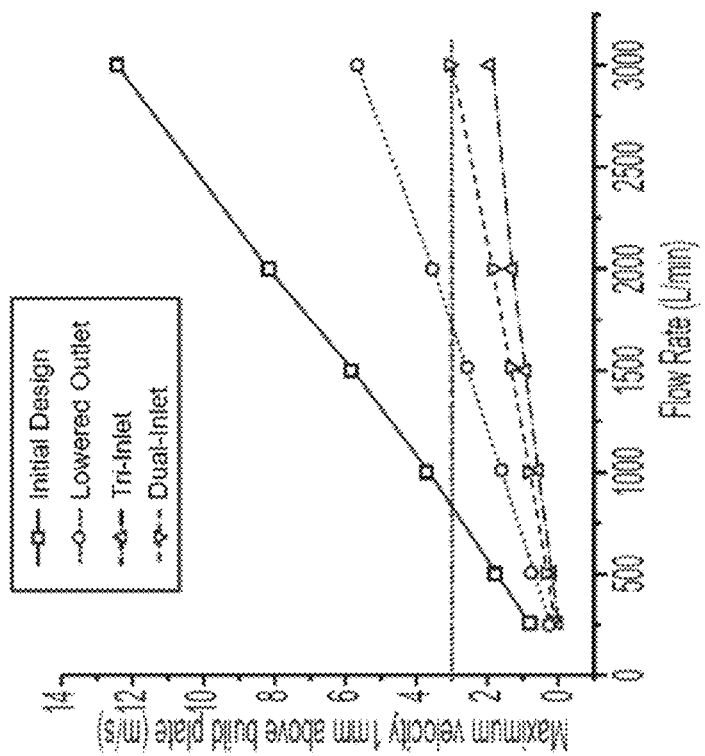

As shown in FIGS. 14A and 14B, by employing one or more of the SLM chamber and gas flow system configurations disclosed herein the clear rate of the chamber can be significantly enhanced leading to the potential for higher part quality. In accordance with some configurations, the resultant clear rate is between 60% and 100%. In accordance with other configurations, the resultant clear rate is between 85% and 99.99%. In accordance with still other configurations, the resultant clear rate is between 95% and 100%. FIG. 14A demonstrates, for example, that for a chamber characterized by an initial design, which does not employ the above-described configuration adjustments may reach a spatter clear rate of approximately 85% at a flow rate of approximately 750 L/min, but does not exceed clear rate of approximately 85% even as the flow rate is increased as high as 3,000 L/min. Additionally, as shown in FIG. 14B, the initial design reaches the threshold velocity 1 mm above the build plate at a flow rate of approximately 800 L/min. The flow rate thus cannot exceed approximately 800 L/min in a chamber orate initial design without risking blowing up particles from the powder bed. Thus, as shown in FIG. 14A, the maximum clear rate of a chamber of the initial design— at the maximum, sub-critical velocity, flow rate—is approximately 84.4%. As further shown in FIGS. 14A and 14B, chamber designs employing the efficient configurations described herein can achieve significantly higher clear rates (than the initial design) at high flow rates without exceeding the threshold velocity 1 mm above the build plate. Accordingly, such designs can achieve higher flow rates and clear rates without risking blowing up particles from the powder bed. FIGS. 14A and 14B demonstrate each of the designs described herein can achieve clear rates of greater than 85% without exceeding the threshold velocity 1 mm above the build plate. Specifically, FIGS. 14A and 14B show that the lowered outlet design achieves a clear rate of approximately 93.3% at its maximum, sub-critical velocity, flow rate of approximately 1,750 L/min. The dual-inlet design achieves a clear rate of approximately 99.5% at its maximum, sub-critical velocity, flow rate of approximately 3,000 L/min. Finally, FIGS. 14A and 14B show that tri-inlet design achieves a clear rate of approximately 99.9% at a flow rate of approximately 3,000 L/min, which is still below its maximum, sub-critical velocity, flow rate.

Figure 15C:
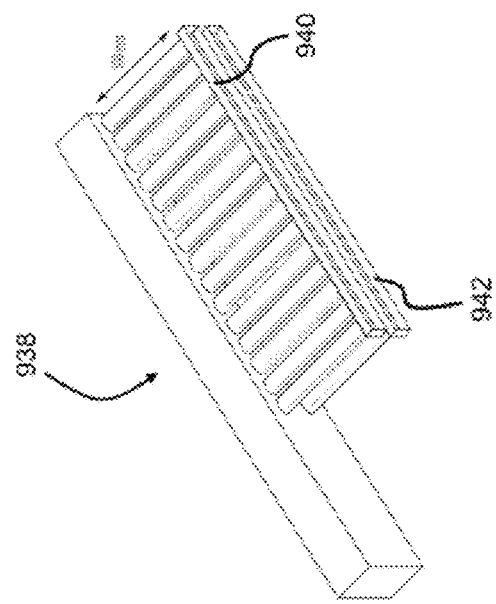
FIGS. 15A to 15C depict examples of inlet channel configurations having different nozzle lengths in accordance with various disclosed embodiments.
Figure 15B:
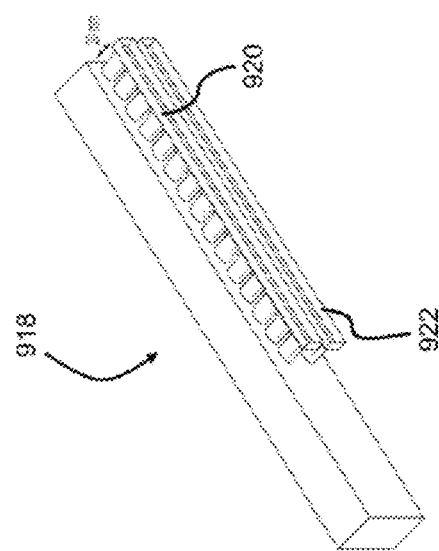
Figure 15A:
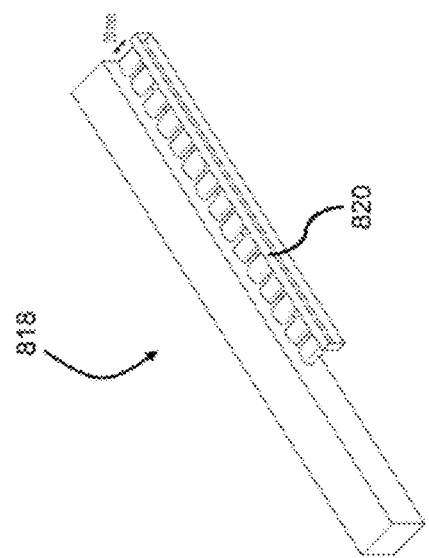

As described above, complications associated with non-uniform gas flow can be addressed by extending the length of the nozzles associated with the gas inlet channels. In accordance with certain embodiments, the gas inlet channel nozzles may be between approximately 20 mm and 150 mm in length. In other embodiments, the gas inlet channel nozzles may be between approximately 50 mm and 120 mm in length. In still other embodiments, the gas inlet channel nozzles may be between approximately 80 mm and 110 mm in length. FIGS. 15A to 15C depict examples of inlet channel configurations having different nozzle lengths in accordance with embodiments of the presents disclosure. FIG. 15A shows an example of a single inlet channel configuration 818 having a series of inlet nozzles 820 having an approximate length of 20 mm. FIG. 15B shows an example of a dual inlet channel configuration 918 having a series of first inlet nozzles 920 and a series of second inlet nozzles 922. As depicted in FIG. 15B, both first inlet nozzles 920 and second inlet nozzles 922 are approximately 20 mm long. In accordance with aspects of the present disclosure, extending the length of gas inlet channel nozzles can be beneficially applied to build chamber configurations employing either single or multiple inlet gas channels. For example, in configurations having a supplementary gas inlet channel positioned below the primary gas inlet channel, lengthening the nozzles of both the gas inlet channels may increase the uniformity of the gas flow leading to better chamber clear rates. FIG. 15C, for example, depicts a dual inlet channel configuration 938 in which the length of both first inlet nozzles 940 and second inlet nozzles 942 has been extended to approximately 100 mm. Further still, in configurations having a supplementary gas inlet channel both above and below the primary gas inlet channel, lengthening the nozzles of all inlet channels may also increase the uniformity of the gas flow leading to better chamber clear rates.

Figure 16A:
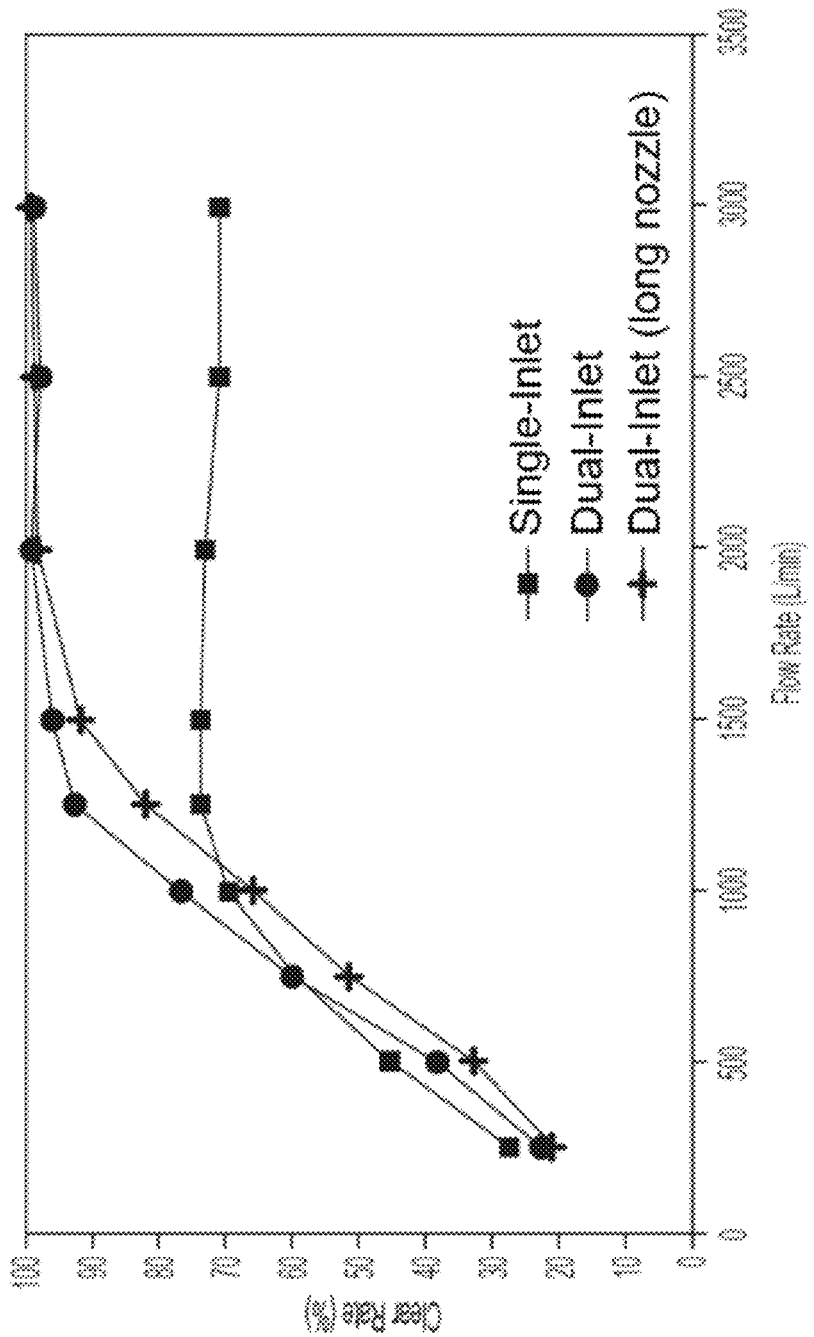
FIGS. 16A and 16B depict graphs showing the clear rate of generated-spatter contamination and maximum gas flow velocity at 1 mm above an SLM build plate as a function of flow rate in accordance with various disclosed embodiments.
Figure 16B:
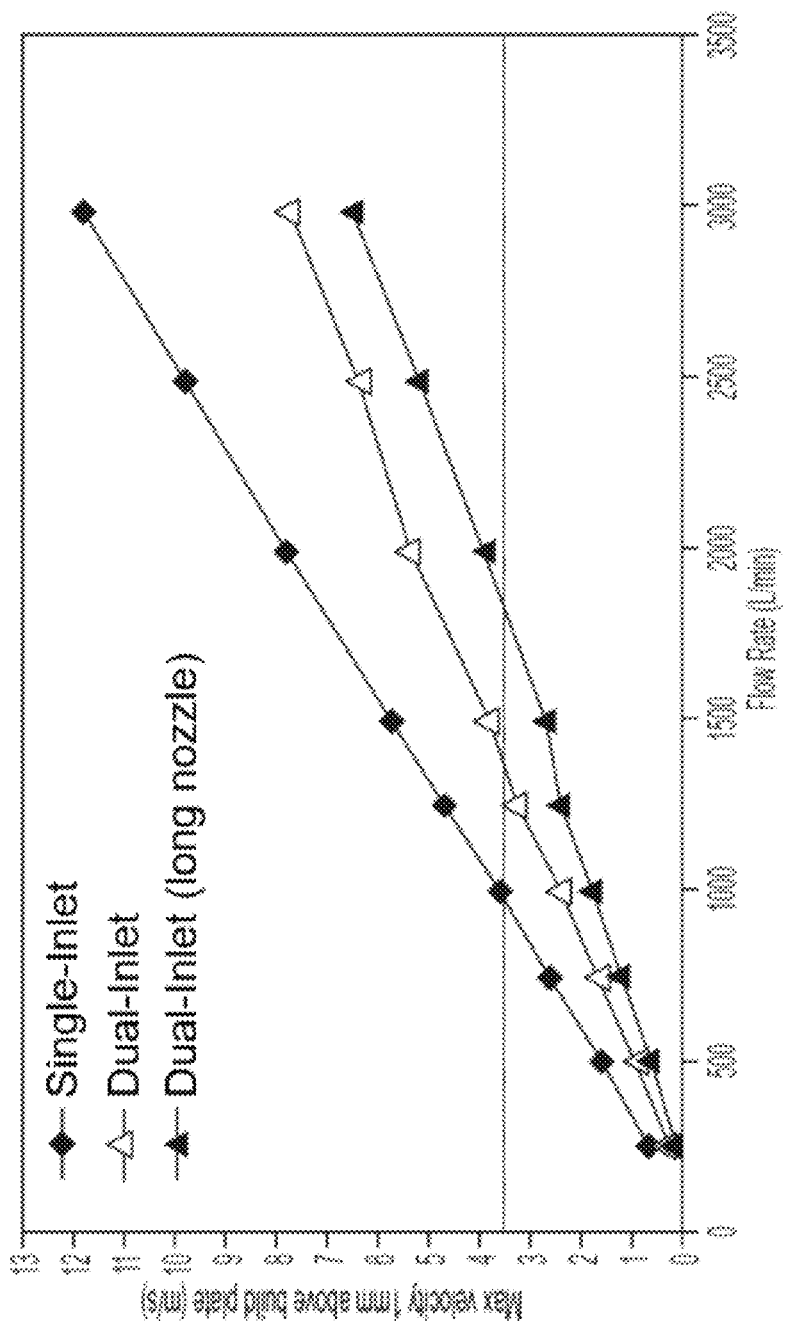

As shown in FIG. 16A, adding a supplementary gas inlet channel and/or increasing the nozzle length of the gas inlet channel(s) may increase the clear rate of the associated chamber. FIG. 16A demonstrates that the maximum clear rate at certain flow rates can be increased from approximately 69% to greater than 95% depending on the specific inlet design configuration. FIG. 16B shows the maximum velocity 1 mm above build plate for the same inlet design configurations. As shown, both a dual-inlet row configuration (such as that shown in FIG. 15B) and an increased-nozzle-length dual-inlet row configuration (such as that shown in FIG. 15C) beneficially decrease the maximum velocity 1 mm above the build plate at all flow rates when compared to a single inlet row configuration (such as that shown in FIG. 15A).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A powder-bed based additive manufacturing apparatus comprising:
    a substrate configured to support a powder bed comprised of powder particles;
    a laser assembly configured to direct a laser beam at the powder bed to create a part from the powder particles, the laser beam creating spatter particles from the powder particles;
    a first gas inlet channel configured to create a first gas flow over the powder bed to entrain spatter particles to generate an entrained spatter particle gas flow;
    a second gas inlet channel configured to create a second gas flow over the powder bed;
    an outlet channel configured to outlet the entrained spatter particle gas flow, the first and second gas inlet channels are within a horizontal orientation of the outlet channel, wherein the first gas inlet channel, the second gas inlet channel, and the outlet channel are configured to entrain and to outlet at least 85 percent of the spatter particles; and
    a third gas inlet channel positioned between 5 and 55 mm above the first gas inlet channel and configured to create a third gas flow within the powder-bed based additive manufacturing apparatus.

2. The powder-bed based additive manufacturing apparatus of claim 1, wherein the first gas inlet channel, the second gas inlet channel, and the outlet channel are configured to entrain and to outlet more than 90 percent of the spatter particles.

3. The powder-bed based additive manufacturing apparatus of claim 1, wherein second gas inlet channel is positioned between 15 and 40 mm below the first gas inlet channel.

4. The powder-bed based additive manufacturing apparatus of claim 1, wherein the outlet channel includes a lower outlet surface positioned between 10 and 30 mm above the substrate.

5. The powder-bed based additive manufacturing apparatus of claim 1, wherein the substrate includes a top surface defining a horizontal build plane and a lower outlet surface of the outlet channel is positioned at approximately the same vertical position as the horizontal build plane.

6. The powder-bed based additive manufacturing apparatus of claim 5, wherein the first gas inlet channel has an array of inlet nozzles positioned along its length and each inlet nozzle has a length of between approximately 50 and 120 mm.

7. A selective laser melting apparatus comprising:
a substrate configured to support a powder bed comprised of powder particles;
a laser assembly suitable for creating a part from the powder particles within the selective laser melting apparatus, the laser assembly creating spatter emissions from the powder particles;
a primary gas inlet channel having an array of inlet nozzles positioned horizontally along its length, wherein the primary gas inlet channel is configured to create a gas flow over the powder bed to entrain spatter emissions to produce an entrained emissions gas flow, each inlet nozzle has a length of between 20 and 120 mm; and
an outlet channel configured to outlet the entrained emissions gas flow, wherein the primary gas inlet channel and the outlet channel are configured to entrain and to outlet more than 85 percent of the spatter emissions.

8. The selective laser melting apparatus of claim 7, wherein the outlet channel includes a lower outlet surface positioned between 0 and 10 mm above the substrate.

9. The selective laser melting apparatus of claim 7, wherein the substrate includes a top surface and a lower outlet surface of the outlet channel is positioned at approximately the same vertical position as the top surface.

10. The selective laser melting apparatus of claim 7, wherein the primary gas inlet channel and the outlet channel are configured to entrain and to outlet more than 90 percent of the spatter emissions.

11. The selective laser melting apparatus of claim 7, wherein the primary gas inlet channel and the outlet channel are configured to entrain and to outlet more than 95 percent of the spatter emissions.

12. The selective laser melting apparatus of claim 7, wherein each inlet nozzle has a length of between 50 and 120 mm.

13. A selective laser melting apparatus comprising:
a substrate configured to support a powder bed comprised of powder particles;
a laser assembly suitable for creating a part from the powder particles within the selective laser melting apparatus, the laser assembly creating spatter emissions from the powder particles;
a primary gas inlet channel having an array of inlet nozzles positioned horizontally along its length, wherein the primary gas inlet channel is configured to create a gas flow over the powder bed to entrain spatter emissions to produce an entrained emissions gas flow;
an outlet channel configured to outlet the entrained emissions gas flow, wherein the primary gas inlet channel and the outlet channel are configured to entrain and to outlet more than 85 percent of the spatter emissions; and
a supplementary gas inlet channel positioned below the primary gas inlet channel and having a supplementary array of inlet nozzles positioned along its length, wherein the supplementary gas inlet channel is configured to create a supplementary gas flow within the selective laser melting apparatus, wherein each inlet nozzle of the supplementary array of inlet nozzles has a length of between 20 and 150 mm.

14. The selective laser melting apparatus of claim 13, wherein the substrate includes a top surface and a lower outlet surface of the outlet channel is positioned at approximately the same vertical position as the top surface.

15. The selective laser melting apparatus of claim 13, wherein the primary gas inlet channel and the outlet channel are configured to entrain and to outlet more than 90 percent of the spatter emissions.

16. The selective laser melting apparatus of claim 13, wherein the primary gas inlet channel and the outlet channel are configured to entrain and to outlet more than 95 percent of the spatter emissions.

17. The selective laser melting apparatus of claim 13, wherein the gas flow is between 200 and 2,000 L/min.

18. The selective laser melting apparatus of claim 13, wherein the gas flow is between 500 and 1,500 L/min.

19. The selective laser melting apparatus of claim 13 further comprising a second supplementary gas inlet channel positioned above the primary gas inlet channel and having a second supplementary array of inlet nozzles positioned along its length, wherein the supplementary gas inlet channel is configured to create a second supplementary gas flow within the selective laser melting apparatus.

20. The selective laser melting apparatus of claim 13, wherein each inlet nozzle of the supplementary array of inlet nozzles has a length of between 50 and 120 mm.

* * * * *